No. 728,494. PATENTED MAY 19, 1903.
H. M. O'MALLEY.
VEHICLE WHEEL.
APPLICATION FILED SEPT. 18, 1902.
NO MODEL.

Witnesses
C. H. Walker.
Geo. E. Tew.

Inventor
Howard M. O'Malley,
by
Milo B. Stevens & Co.
Attorneys

No. 728,494. Patented May 19, 1903.

UNITED STATES PATENT OFFICE.

HOWARD M. O'MALLEY, OF CHAGRIN FALLS, OHIO.

VEHICLE-WHEEL.

SPECIFICATION forming part of Letters Patent No. 728,494, dated May 19, 1903.

Application filed September 18, 1902. Serial No. 123,849. (No model.)

*To all whom it may concern:*

Be it known that I, HOWARD M. O'MALLEY, a citizen of the United States, residing at Chagrin Falls, in the county of Cuyahoga and State of Ohio, have invented certain new and useful Improvements in Vehicle-Wheels; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to vehicle-wheels, and particularly to the manner of constructing the same. It embodies the use of wooden compression-spokes in connection with wire tension-spokes, which also act as braces to the wooden spokes.

The object of the invention is to form a wheel of sufficient strength to be used on motor and other vehicles and of greater lightness than an all-wood wheel and of greater strength than a wheel having wire spokes only. By the use of this invention the wires act as braces to the wooden spokes and allow the wheel to be made of fewer wooden spokes than would otherwise be the case, also avoiding the necessity for staggering the spokes.

Figure 1:
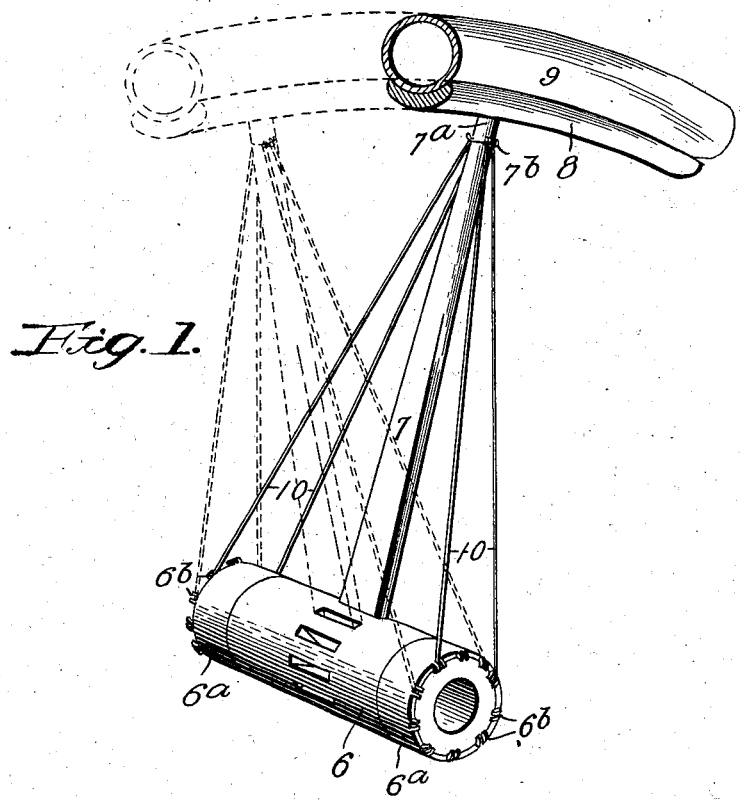
Figure 2:
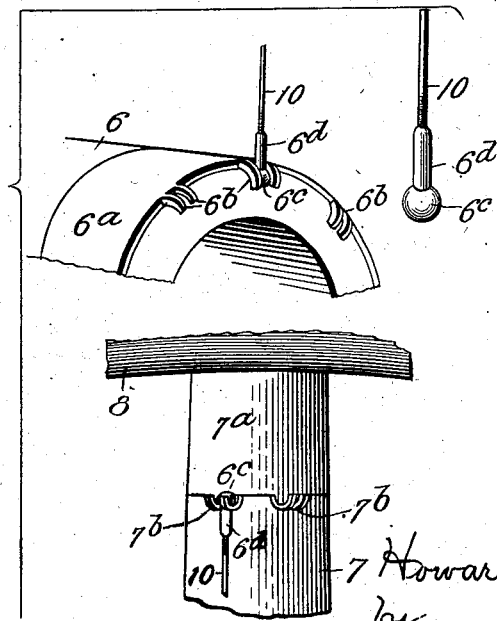

In the accompanying drawings, Figure 1 is a perspective view of a part of the wheel. Fig. 2 is an enlarged detail showing how the wires are attached to the hub and wooden spokes.

Referring specifically to the drawings, 6 indicates the hub of the wheel; 7, the wooden spokes mortised in a single line straight around and in the hub; 8, the rim, and 9 the tire, which is shown as pneumatic. The particular construction of the rim and tire is not material to my invention. At each end of the hub are annular bands $6^a$. If the hub is made of metal, these bands may well be formed integral therewith. If the hub is made of wood, as indicated in the drawings, the bands are secured thereto in any proper manner. The wire spokes are indicated at 10, and they extend from the band to the outer end of the wooden spokes, bracing them on both sides. Each wooden spoke is braced by four wires, two on a side, and the wires are preferably set tangentially, as shown.

The wire spokes are joined to the bands by hook-fingers $6^b$, projecting at the outer edges of the bands and engaging the heads $6^c$ of socket-pieces $6^d$, into which the ends of the wires are screwed. They are joined to the wooden spokes by means of ferrules $7^a$ on said spokes adjacent to the rim, said ferrules having hook-fingers $7^b$, similar to the fingers $6^b$, engaging socket-pieces $6^d$ the same as above described.

The means for attaching the wires to the hub-bands and the wooden spokes may be varied as desired; but the construction shown and described is believed to be advantageous and of good appearance.

By the invention disclosed the wire spokes partly support the weight under tension and also serve to bind the wooden spokes in the hub and to prevent the wheel from buckling. The tangential arrangement of the wires causes them to cross each other, and, if desired, they may be tied where they cross to give increased rigidity to the wheel.

What I claim is—

1. In a wheel, the combination with a hub and a rim, of a middle line of compression-spokes, and outer lines of tangential tension-braces on both sides thereof, joined to the heads of the spokes and to the hub at a distance from the feet of the spokes, bracing the spokes laterally and circumferentially, substantially as described.

2. In a wheel, the combination with a hub and a rim, of compression-spokes, and tension-braces on both sides thereof, joined to the heads of the spokes and to the hub at a distance from the feet of the spokes.

3. In a wheel, the combination with a hub having annular bands at its ends, and a rim, of wooden spokes between the bands, and wire spokes spaced at the hub from the wooden spokes and extending from the bands to the heads of the wooden spokes.

In testimony whereof I affix my signature in presence of two witnesses.

HOWARD M. O'MALLEY.

Witnesses:
JOHN A. BOMMHARDT,
LOTTIE NEWBURN.